(12) United States Patent
Jones et al.

(10) Patent No.: US 6,929,404 B2
(45) Date of Patent: Aug. 16, 2005

(54) CONNECTOR FOR MAKING AN OPTICAL CONNECTION UNDERWATER

(75) Inventors: Mark R. Jones, Grange-over-Sands (GB); Gillian A. McKinnon, Dalton-in-Furness (GB)

(73) Assignee: Tronic Limited, Cumbria (GB)

(*) Notice: Subject to any disclaimer, the term of this patent is extended or adjusted under 35 U.S.C. 154(b) by 170 days.

(21) Appl. No.: 10/415,528

(22) PCT Filed: Oct. 31, 2001

(86) PCT No.: PCT/GB01/04822

§ 371 (c)(1), (2), (4) Date: Apr. 29, 2003

(87) PCT Pub. No.: WO02/39169

PCT Pub. Date: May 16, 2002

(65) Prior Publication Data

US 2004/0028342 A1 Feb. 12, 2004

Related U.S. Application Data

(60) Provisional application No. 60/253,263, filed on Nov. 27, 2000.

(51) Int. Cl.[7] .................................................. G02B 6/38
(52) U.S. Cl. .......................................... 385/56; 385/66
(58) Field of Search ...................................... 385/56–68

(56) References Cited

U.S. PATENT DOCUMENTS 4,373,767 A * 2/1983 Cairns ........................ 439/275
4,641,915 A * 2/1987 Asakawa et al. ............. 385/26
4,696,540 A * 9/1987 Adams et al. ................ 385/66
4,756,595 A   7/1988 Braun et al. ............. 350/96.21
4,948,377 A * 8/1990 Cairns ........................ 439/200
5,046,814 A * 9/1991 Crespo-Ruiz et al. ....... 385/113
5,645,438 A   7/1997 Cairns ........................ 439/139
5,838,857 A   11/1998 Niekrasz ...................... 385/56

FOREIGN PATENT DOCUMENTS

WO          WO 99/31540        6/1999

OTHER PUBLICATIONS

International Search Report corresponding to International Application No. PCT/GB 01/04822 dated Feb. 8, 2002.

* cited by examiner

Primary Examiner—Ellen E. Kim
(74) Attorney, Agent, or Firm—Alix, Yale & Ristas, LLP

(57) ABSTRACT

A connector for making an optical connection underwater or in a wet environment, including first and second connector parts adapted to be interengaged, the first connector part having a probe and the second connector part having a chamber containing fluid media. The probe has a forward portion for entry into the chamber of the second part containing fluid media during interengagement of the connector parts, so that when the connector parts are interengaged the probe provides an optical path between the first connector part and the chamber of the second connector part and passing into the chamber of the second connector part at a slant to the axial direction. The probe slides axially through the opening in sliding engagement with a seal and continues to do so as the forward portion of the probe advances into the chamber containing fluid media.

20 Claims, 18 Drawing Sheets

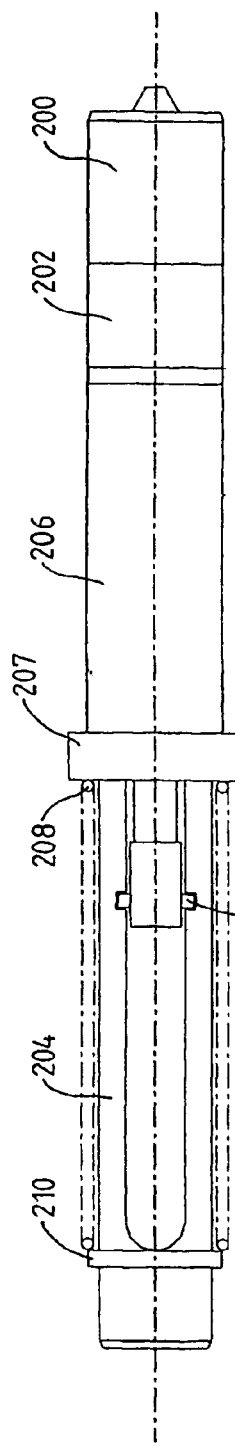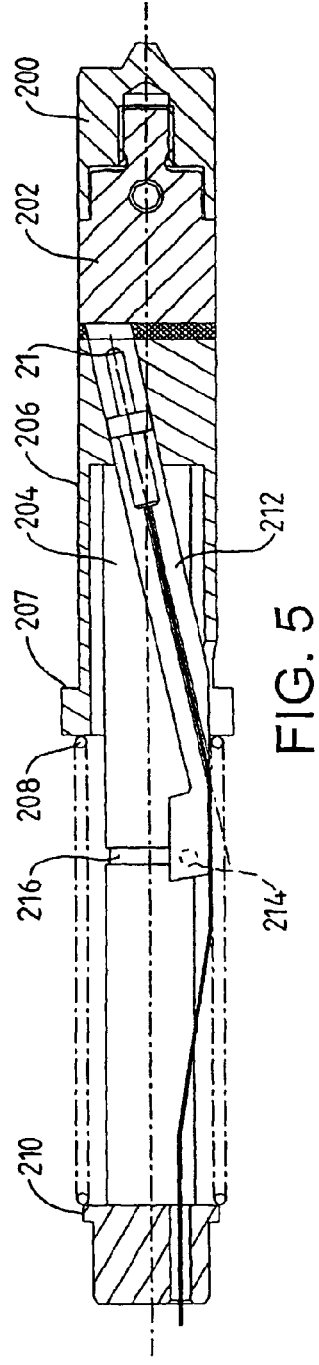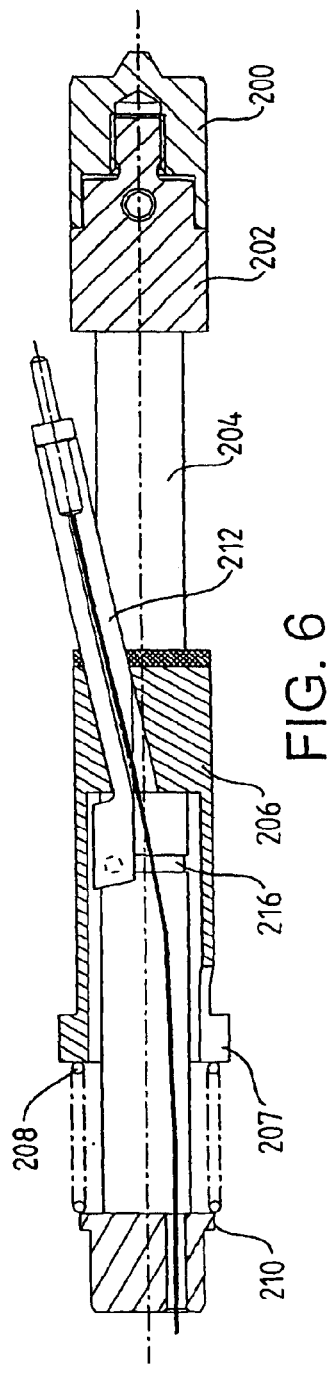

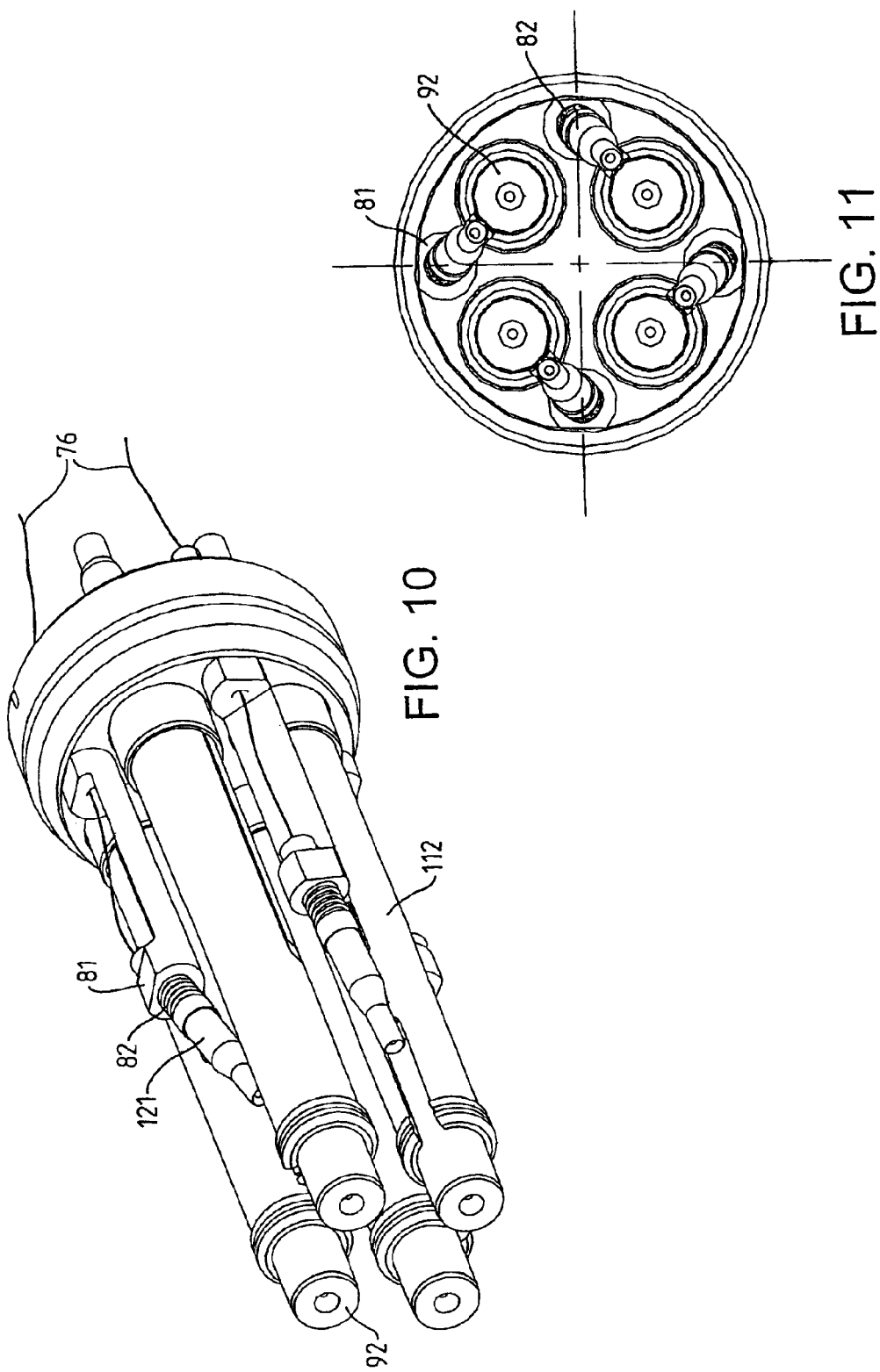

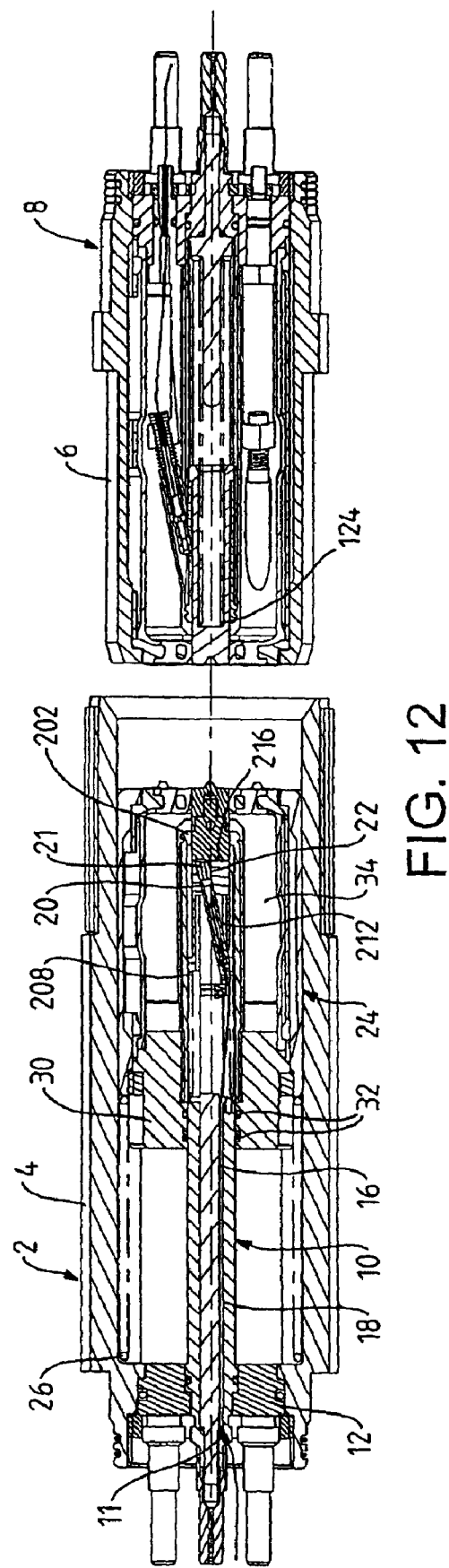

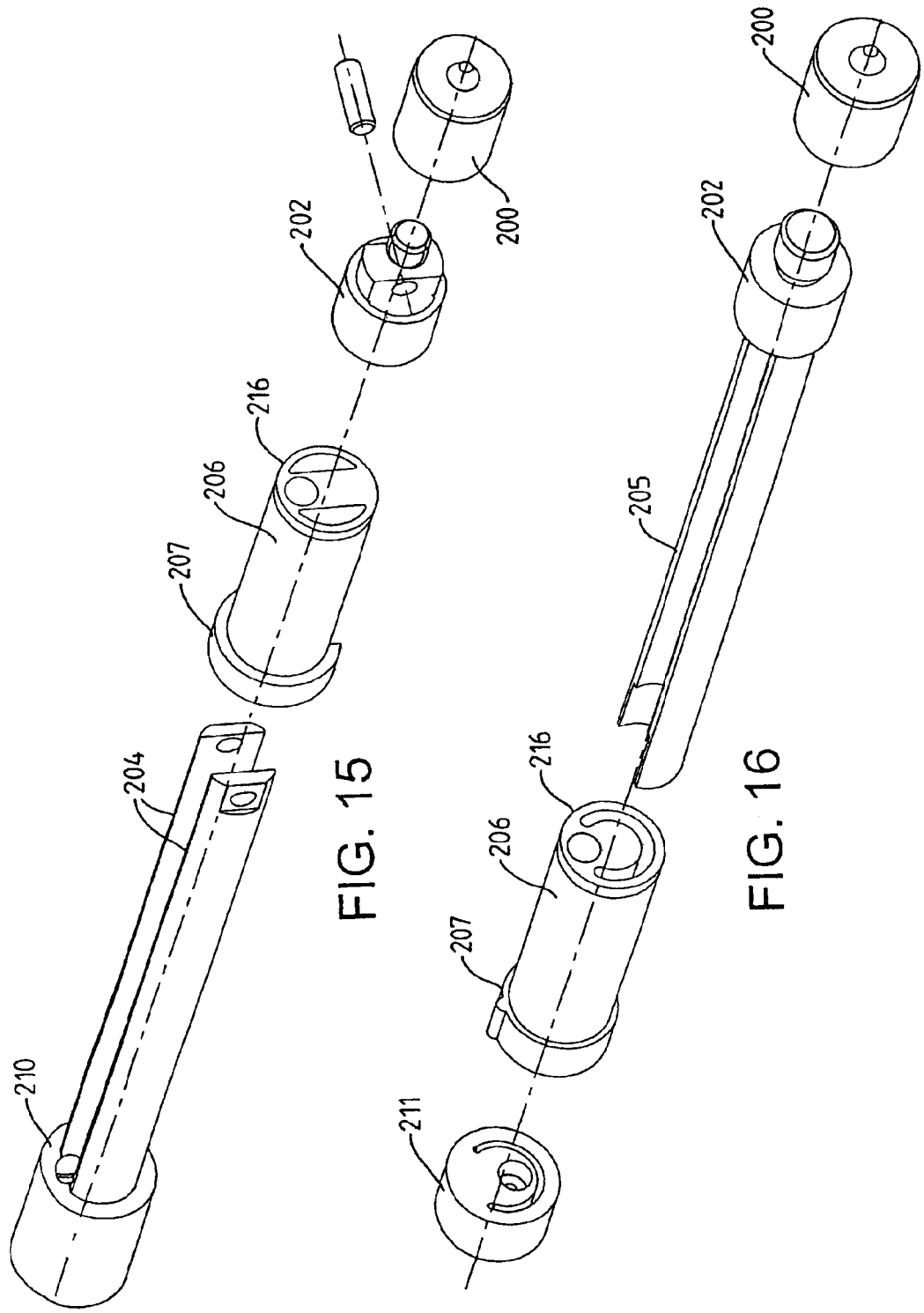

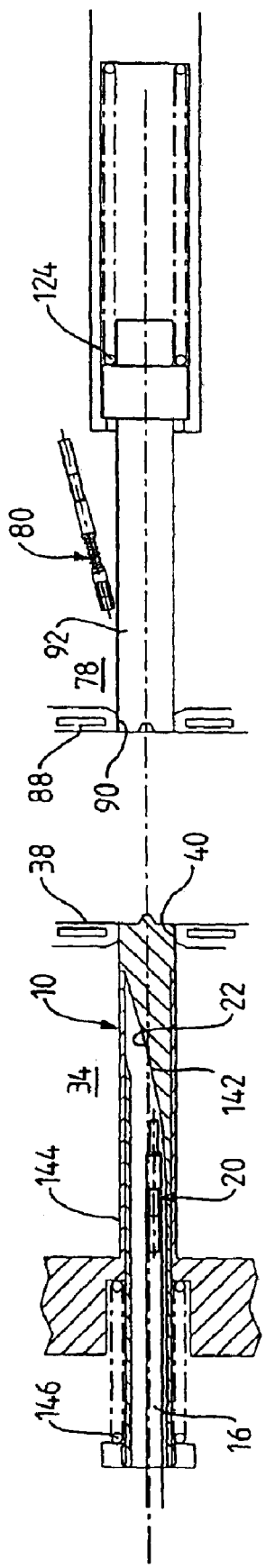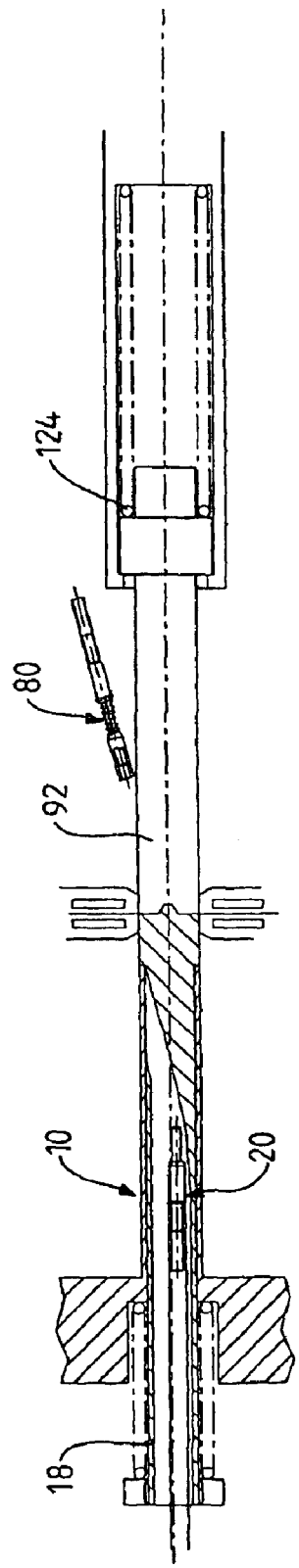
FIG. 20a
FIG. 20b

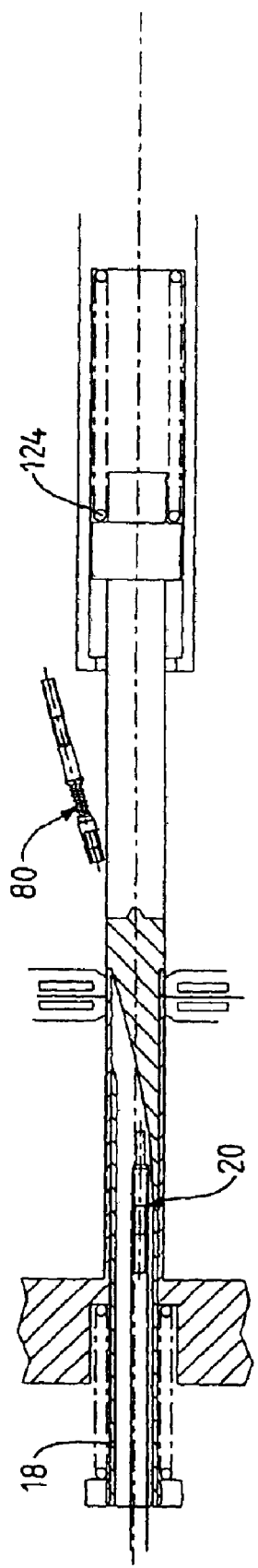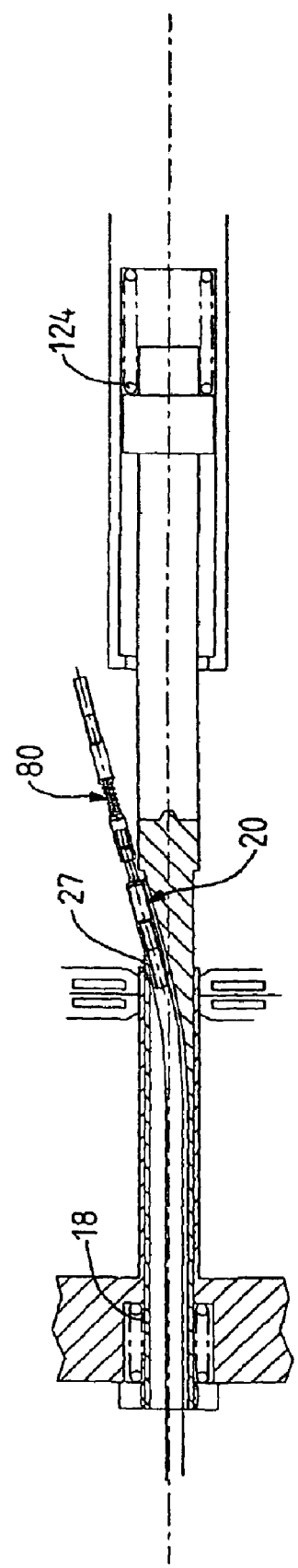

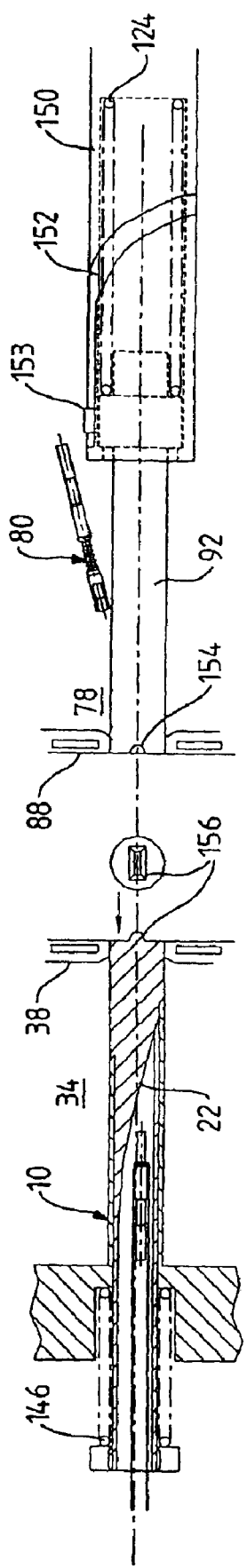
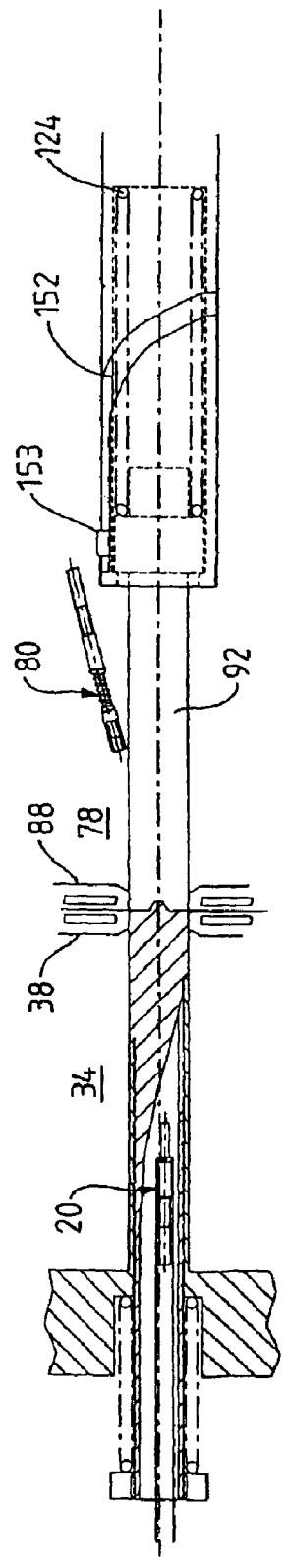
FIG. 21a
FIG. 21b

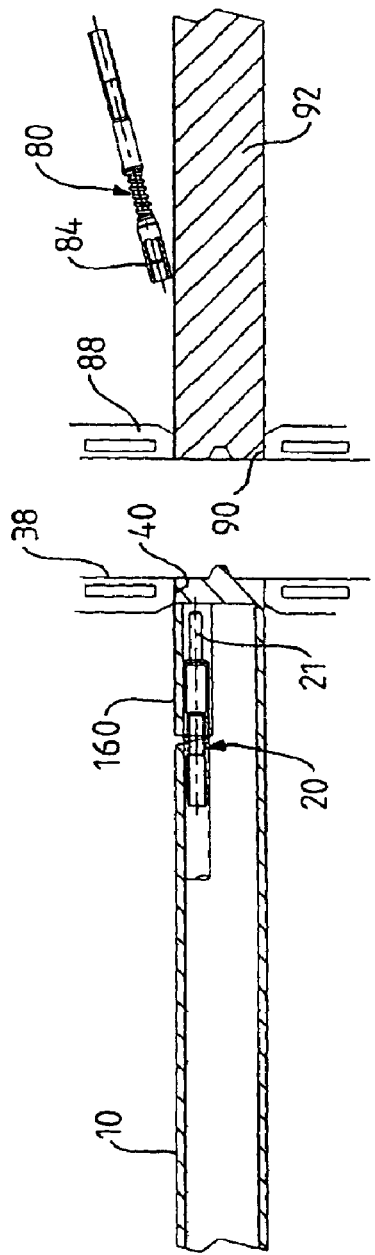
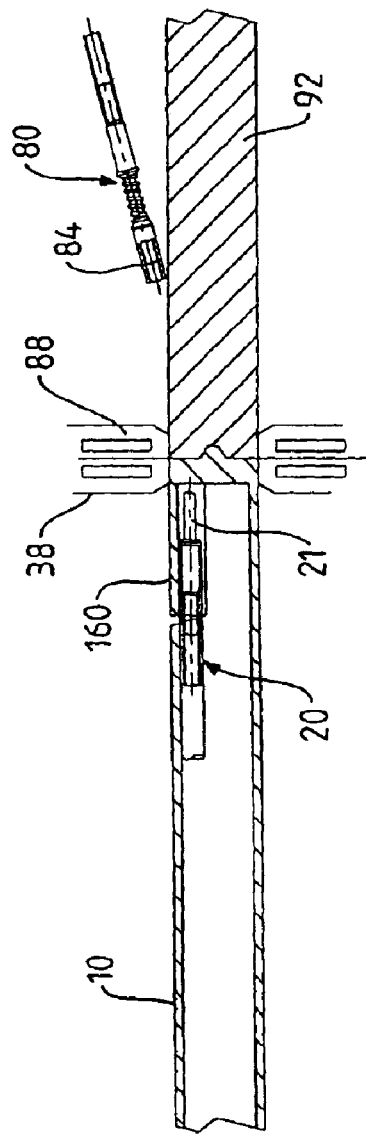

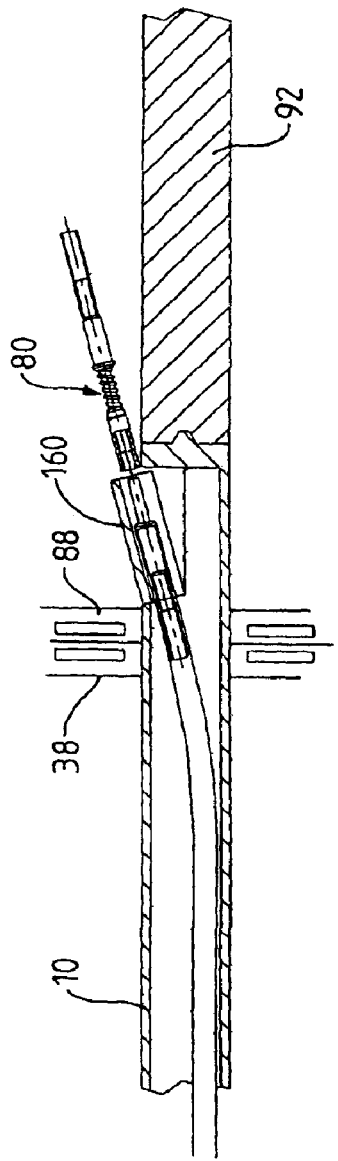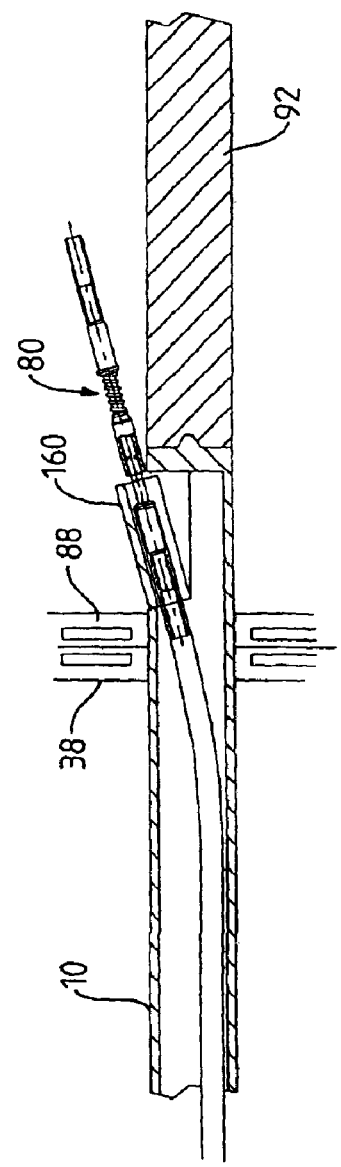

CONNECTOR FOR MAKING AN OPTICAL CONNECTION UNDERWATER

This application is the National Stage of International Application No. PCT/GB01/04822 filed Oct. 31, 2001, which claims the benefit of Provisional Application No. 60/253,263 filed Nov. 27, 2000, and United Kingdom Patent Application No. GB 0026582.7 filed Oct. 31, 2000.

BACKGROUND OF THE INVENTION

This invention relates to an optical connector for making an optical connection underwater or in a wet environment.

Optical fibres are frequently used for communication purposes, and it is often necessary to form an optical connection between the ends of such fibres. This generally involves bringing together two connector components each supporting a respective fibre and making end-to-end contact between the fibres. In the case of underwater connectors, it is known to provide the connector components with end sealing arrangements so that the optical fibre ends are protected from the outside environment when the components are in a disconnected state, the end sealing arrangements opening up during connection to allow passage of one of the optical fibre ends therethrough in order to establish the optical connection.

It has been proposed for example in U.S. Pat. No. 4,887,883 to provide the two connector components of an underwater optical fibre connector with end sealing arrangements each comprising a relatively thick (in the axial direction) seal member with an axial opening formed therethrough. The axial openings are kept closed by the resilience of the seal members when the components are disconnected, and during connection a wand structure supporting an optical fibre pushes its way through the mating seal members of the two components. The axially directed optical end face of the optical fibre then makes contact with the end face of the optical fibre in the other connector component. However, with such an arrangement there is a risk of damage to the optical end faces of the optical fibres caused by particles of sand, silt or the like which have lodged on the seal members. Such particles may be transferred on to the end face of the wand supported optical fibre as it forces its way through the seal members and may be carried forward and sandwiched between that end face and the end face of the other optical fibre.

Another arrangement using the idea of sealed chambers which open up during mating to enable an optical connection to be made between axially directed end faces of optical fibres is disclosed in WO-A-9 622 554. During connection, the end of a wand supporting an optical fibre in one connector component exits a chamber of that component and enters a chamber in the other component. In this arrangement, instead of having resilient seal members with axial openings which have to be forced open by the wand, each connector component has a laterally movable gate for opening up the respective chamber during mating. During connection, the movable gate of the chamber housing the wand end opens first, the wand end passes through a region containing ambient water, and the movable gate of the other chamber opens to allow entry of the wand. The wand then passes axially along an oil-filled tube of about the same diameter as the wand, forcing oil out of the tube via a side vent, until end-to-end engagement is made between the respective optical fibres. With such an arrangement, if the ambient water contains debris such as sand, silt or the like, then there is again a risk that particles of debris will lodge against the end face of the wand supported optical fibre and then be carried forward along the oil-filled tube to be sandwiched between that end face and the end face of the other optical fibre. Further, the mechanism and sealing arrangement is complex which is not desirable in subsea operations.

Alternative underwater optical connectors have been proposed in WO-A-8 500 899 and GB-A-2 166 261 having laterally facing optical end faces rather than axially directed end faces. In these arrangements a probe belonging to a male connector component is arranged to push back a stopper piston of a female connector component to enable a laterally facing optical end face on the probe to form an optical coupling with a laterally facing optical end face in the female connector component. In the disconnected condition, the optical end face of the probe is covered by a sleeve. During connection, the sleeve slides back axially along the probe, during which action a wiper passes over the optical end face to wipe it. Similarly, a wiper on the stopper piston wipes the optical end face in the female connector component as the stopper piston is pushed back. Although these known proposals avoid the problem of debris becoming lodged on an axial end face of an optical member when it emerges from its housing, they rely on the effectiveness of the wiping action, and if the wipers deteriorate with time the optical coupling may become contaminated. Moreover, in the connected condition of the connector, the region where the optical coupling is made is not sealed from the outside and may therefore be subject to entry of contaminants.

Another optical connector has been proposed in WO 98/45899, in which the use of axially directed end faces of the optical components to be connected is avoided. In this arrangement a female connector component has a plurality of optical contacts arranged in an annular chamber in a housing, at circumferential intervals around the outside of a retractable cover sleeve, and pointing inwardly towards the cover sleeve. A male connector component has an axially centrally arranged pusher member, also provided with a retractable cover sleeve. A plurality of flexible tubes holding optical fibres are supported at circumferential intervals around the outside of the rear of the pusher member and project forwardly in cantilever fashion. The flexible tubes extend radially outwardly as well as forwardly in such a way that their own resilience urges them against the inside of the cover sleeve. When the male and female connector components are to be mated, a seal ring on the pusher member engages the cover sleeve of the female connector component, whilst a seal ring on the housing of the female connector component engages the cover sleeve of the male connector component. With further axial interengagement, the pusher member pushes the female cover sleeve rearwardly to retract it, and the female housing pushes the male cover sleeve rearwardly to retract that sleeve. Eventually, the annular chamber where the optical contacts of the female connector component are housed is joined with the region where the cantilevering flexible tubes of the male connector component are supported. The flexible tubes are released from being held down by the male cover sleeve and splay outwardly into internal guide grooves in the female housing. Optical contacts at the ends of the flexible tubes then complete optical circuits with the optical contacts of the female component.

SUMMARY OF THE INVENTION

According to an aspect of the invention there is provided a connector for making an optical connection underwater or in a wet environment, comprising a probe on a first connector part arranged to pass through a seal on a second connector part, so as to provide an optical path which extends through a side of the probe. The optical path is preferably arranged to be slanted to the axis of the probe at least where it extends through the side thereof.

By arranging the optical path to extend through a side of the probe and preferably at a slant to the axial direction, rather than having axially directed optical end faces, the risk of damage or signal attenuation caused by particles of sand, silt or the like being trapped between such end faces is minimised.

According to another aspect of the invention there is provided a connector for making an optical connection underwater or in a wet environment, comprising first and second connector parts adapted to be interengaged, the first connector part having a first optical member for establishing an optical coupling with a second optical member of the second connector part when the connector parts are interengaged, the first connector part having a probe and the second connector part having a chamber containing fluid media and being provided with a seal defining an opening thereto, wherein the probe has a forward portion for entry into the chamber of the second part containing fluid media during interengagement of the connector parts, so that when the connector parts are interengaged the probe provides an optical path between the first connector part and the chamber of the second connector part and thereby allows the first and second optical members to establish said optical coupling, said optical path extending from the first connector part along the probe and passing into the chamber of the second connector part at a slant to the axial direction, and wherein during interengagement of the connector parts the probe slides axially through the opening in sliding engagement with the seal and continues to do so as the forward portion of the probe advances into the said chamber containing fluid media.

The probe of the first connector part thus gains access to the chamber of the second connector part and provides an optical path between the connector parts allowing the optical coupling to be established. When the connector parts are interengaged the probe extends through the opening to the chamber of the second connector part in sealing engagement with the seal, and thus achieves sealed communication between the two connector parts in a simple manner.

The connector may be arranged so that after the probe has entered the chamber of the second connector part the second optical member moves forwardly via the probe into the first connector part where the optical coupling between the first and second optical members is established. Preferably, however, the first optical member enters the chamber of the second connector part and the optical coupling between the first and second optical members is established therein.

In preferred arrangements, the first optical member is disposed internally of the probe at least during the passage of the probe through the seal at the opening to the chamber of the second connector part. This can ensure protection of the first optical member during the mating procedure, for example from debris which has lodged on the unmated components.

The first optical member may be exposed at a side opening of the probe ready for coupling with the second optical member. Preferably, however, the probe comprises relatively movable parts arranged to enclose the first optical member when the first and second connector parts are not interengaged and arranged to open after the probe has entered the chamber of the second connector part to allow the optical coupling between the first and second optical members to be established. In this way, as the probe slides axially through the opening to the second connector part chamber in sliding engagement with the seal during the interengagement procedure, the probe can substantially maintain sealing engagement with the seal and thus keep the chamber sealed against ingress of debris. One of the relatively movable parts of the probe may take the form of a cover arranged to pivot laterally outwardly to effect the desired opening, or there may be a cover which is axially retractable relative to the rest of the probe.

In a preferred arrangement, the connector comprises a first spring arranged to deform during a first phase of interengagement of the connector parts until the forward portion of the probe is located in the chamber of the second connector part containing fluid media, and a second spring arranged to deform during a second phase of interengagement of the connector parts to permit the forward portion of the probe to advance forwardly relative to a rear portion and thereby allow the optical coupling between the first and second optical members to be established.

The optical members to be coupled may not have to make physical contact with each other, for example if they comprise expanded beam terminations, such as a plano-convex rod lens, a graded index (GRIN) rod lens, or a spherical lens. It is currently preferred to use ferules which are brought into physical contact to establish the optical coupling. It is generally useful to provide an arrangement in which one of the optical members can be moved to assist this. Preferably, after the probe has entered the chamber of the second connector part, at least one of the first and second optical members is arranged to move from a retracted position to a coupling position. The optical member in question may be kept in the retracted position during the initial interengagement procedure, keeping it protected from any debris. It may then advance to the coupling position to establish the optical coupling once the probe interconnects the two connector parts.

In preferred arrangements, it is the first optical member which is arranged to move relative to the probe from said retracted position to said coupling position, the first optical member protruding laterally from a side of the probe when in the coupling position.

It is particularly preferred for the first optical member to be arranged to move relative to a guide portion of the probe during interengagement of the connector parts, the guide portion being arranged to urge the first optical member laterally outwardly of the probe from a retracted position to a coupling position during said interengagement. Thus, the first optical member is urged to its coupling position during interengagement, and preferably also urged to its retracted position during disengagement, by the guide portion. This gives a controlled movement and ensures reliable establishment of the optical coupling. Further, by not relying on the resilience of a flexible tube to move the first optical member to its coupling position, the possibility of permanent set or relaxation occurring in such a flexible tube if the connector is left unmated for some time, preventing correct operation, is eliminated. Preferably, the probe has a surface slanted relative to the axial direction which guides the first optical member to the coupling position.

Although the first optical member may be supported on a flexible support, it is preferably supported on a rigid support in order to assist with alignment accuracy when establishing the optical coupling. The rigid support may be at a fixed angle to the axial direction and arranged to move laterally to establish the optical coupling, for example by using a camming arrangement.

It is further preferred for the first optical member to be supported by the probe at, or adjacent to, a region where the optical coupling with the second optical member is established. If by contrast the first optical member were supported by the probe at a large distance from where it couples with the second optical member, there is some potential for misalignment of the optical members. Such risk of misalignment may be substantially minimised with the preferred arrangement.

The seal at the chamber opening of the second connector part may be of the type which is self-closing, for example by virtue of the resilience of the material of which it is made, and which can be forced open by the probe during interengagement of the connector parts. It is however preferred to provide the second connector part with a shuttle piston resiliently biased to a forward position in which it engages a radially inwardly facing surface of the seal so as to close the opening defined thereby when the connector parts are disengaged, the shuttle piston being arranged to be engaged by the probe and urged rearwardly during interengagement of the connector parts, the probe then engaging the radially inwardly facing surface of the seal so as to close the opening defined thereby. With such an arrangement, the shuttle piston blocks the chamber opening when the connector parts are disengaged, and the probe can block the chamber entrance when the connector parts are interengaged.

According to a further aspect of the invention, there is provided a connector for making an optical connection underwater or in a wet environment, comprising first and second connector parts adapted to be interengaged, the first connector part having a first optical member for establishing an optical coupling with a second optical member of the second connector part when the connector parts are interengaged, the second connector part having a chamber containing fluid media and being provided with a seal defining an opening thereto, and the second connector part being provided with a shuttle piston resiliently biased to a forward position in which it engages a radially inwardly facing surface of the seal so as to close the opening defined thereby when the connector parts are disengaged, and the first connector part having a probe for entry into the chamber of the second part containing fluid media during interengagement of the connector parts, the shuttle piston of the second connector part being arranged to be engaged by the probe and urged rearwardly during said interengagement, the probe then engaging the radially inwardly facing surface of the seal so as to close the opening defined thereby, and, when the connector parts are interengaged, the probe providing an optical path between the first connector part and the chamber of the second connector part to allow the first and second optical members to establish said optical coupling, said optical path extending from the first connector part along the probe and passing into the chamber of the second connector part at a slant to the axial direction.

The second connector part preferably comprises pressure balancing means for allowing pressure in the chamber to balance relative to external pressure. Such pressure balancing may be provided by e.g. a piston and cylinder arrangement but preferably the chamber has a flexible wall portion to provide pressure balancing. An advantage of a pressure balanced system is that this reduces any tendency for water or contaminants to enter the chamber e.g. via the opening thereto, particularly during interengagement when the probe enters the chamber. In addition, by avoiding any substantial pressure difference across the seal at the chamber entrance, the probe can move relatively freely into and out of the chamber.

The second connector part may be provided with a single chamber containing fluid media. Preferably the chamber of the second connector part comprises an outer sub-chamber and an inner sub-chamber. The use of a probe to provide an optical path allows for the incorporation of more than one sub-chamber without over complicating the overall design of the connector. This is generally not the case in the prior art connectors. The ability to provide more than one sub-chamber is a significant advantage of the use of a probe which slides axially into the second connector part.

In preferred embodiments, the outer sub-chamber is provided with said seal defining said chamber opening, and the inner sub-chamber is provided with a seal defining an inner sub-chamber opening, and wherein during interengagement of the connector parts the probe slides axially through the outer and inner sub-chamber openings and in sliding engagement with their respective seals, whilst the forward portion of the probe advances into the inner sub-chamber. Preferably the outer and inner sub-chambers are pressure balanced. They may for example have respective flexible wall portions exposed to external pressure, or the inner sub-chamber may have a flexible wall portion exposed to the fluid media in the outer sub-chamber.

A plurality of probes may be provided for providing a plurality of optical paths. A separate inner sub-chamber may be provided to receive each probe. Thus if sealing integrity of one inner sub-chamber is compromised this need not compromise any other inner sub-chamber.

It is preferred for the first connector part to comprise a probe chamber in which the first optical member is disposed when the connector parts are not interengaged, the probe chamber and the probe being relatively axially movable to allow the probe to emerge from the probe chamber during interengagement of the connector parts, and the probe chamber containing fluid media. The first optical member can thus be kept in a protected condition when the connector parts are disengaged.

The probe chamber is preferably provided with an opening thereto through which the probe passes axially during interengagement of the connector parts, with a probe seal being provided at the probe chamber opening, wherein when the connector parts are interengaged the probe extends through the opening in sealing engagement with the probe seal.

The seal at the probe chamber opening may be of the type which is self-closing, for example by virtue of the resilience of the material of which it is made, and which can be forced open by the probe during interengagement of the connector parts. It is however preferred for the probe to be arranged to block the probe chamber opening when the connector parts are disengaged, and for the probe also to block the probe chamber opening when the connector parts are interengaged.

Preferably, the first connector part further comprises pressure balancing means for allowing pressure in the probe chamber to balance relative to external pressure. Such pressure balancing may be provided by e.g. a piston and cylinder arrangement but preferably the probe chamber has a flexible wall portion to provide pressure balancing. An advantage of a pressure balanced system is that this reduces any tendency for water or contaminants to enter the probe chamber, particularly during disengagement when the probe withdraws into the probe chamber. In addition, by avoiding any substantial pressure difference across a seal at the probe chamber opening, the probe can move relatively freely out of and into the probe chamber.

The first connector part may be provided with a single probe chamber containing fluid media. Preferably the probe chamber of the first connector part comprises an outer sub-chamber and an inner sub-chamber. The use of a probe to provide an optical path allows for the incorporation of more than one probe sub-chamber without over complicating the overall design of the connector. This is generally not the case in the prior art connectors.

In preferred embodiments, the outer and inner sub-chambers of the probe chamber are provided with respective seals defining respective openings thereto, and wherein during interengagement of the connector parts the probe slides axially through the inner and outer probe sub-chamber openings in sliding engagement with their respective seals. Preferably the probe outer and inner sub-chambers are pressure balanced. They may for example have respective flexible wall portions exposed to external pressure, or the probe inner sub-chamber may have a flexible wall portion exposed to the fluid media in the probe outer sub-chamber.

Where a plurality of probes are provided for providing a plurality of optical paths, a separate probe inner sub-chamber may be provided to receive each probe. Thus if sealing integrity of one probe inner sub-chamber is compromised this need not compromise any other probe inner sub-chamber.

It is preferred for the chamber of the second connector part and the chamber of the first connector part to be sealed from each other when the first and second connector parts are interengaged. This improves the sealing properties of the connector. In particular, if the integrity of the probe chamber is compromised, this will not affect the integrity of the chamber of the second connector, where the optical coupling will normally be established.

The connector may provide for an optical coupling only, but it is preferred to provide a combined electrical and optical connector, i.e. an electro-optical connector. An electrical path may be provided for example by a separate electrical probe, for making electrical contact with an electrical socket of the other connector part, for example of the type known from GB-A-2 192 316. Preferably, the probe which provides the optical path is provided with a first electrical contact portion, and the second connector part has a second electrical contact portion, the first and second electrical contact portions being arranged to make electrical contact when the connector parts are interengaged. Such an arrangement provides a significant advance over the known optical connectors, because the probe which is used to provide the optical path is also used to provide an electrical path. The size of the electrical path is not limited by the size of the opening in a laterally movable gate, as in WO-A-9 622 554, nor by the size of the flexible tube cantilevers as in WO 98/45899. In the absence of the size constraints imposed by the prior art designs, relatively high current ratings can be achieved using a given probe, whilst also providing an optical path. Thus, both the optical and the electrical paths may be provided using a single probe. Conveniently the electrical contact may be made in the chamber of the second connector part, in which case the fluid media in the chamber will be a dielectric.

The first electrical contact portion may be provided on the side of the probe, for example as a contact ring. The second electrical contact portion may then be a contact socket in which the ring is engageable. Alternatively, the first electrical contact portion may be provided at the front of the probe. This arrangement is however less preferred, since it means that when disconnected the first electrical contact would be exposed to the outside.

In the preferred embodiment where the second connector part has an inner sub-chamber which is entered by the probe, the second electrical contact portion may be provided in the outer sub-chamber, but preferably it is provided in the inner sub-chamber. Where the first connector part has probe outer and inner sub-chambers, when the connector parts are disconnected the first electrical contact portion may be located in the outer sub-chamber, but preferably it is located in the inner sub-chamber. Thus in a particularly preferred embodiment, the first optical member and the first electrical contact are both arranged in a probe inner sub-chamber when the connector parts are disconnected, and the second optical member and the second electrical contact are both arranged in an inner sub-chamber of the second connector part when the connector parts are interengaged. Thus there is a dual barrier between the optical and electrical components and the outside throughout.

The fluid media in the chamber may be gel or oil or the like. Its refractive index, together with that of all other optical components, will be appropriately selected to optimise light transmission through the connector.

BRIEF DESCRIPTION OF THE DRAWINGS

Certain preferred embodiments of the invention will now be described, by way of example only, and with reference to the accompanying drawings, in which:

FIG. 4 is a top view of a probe of the first connector part;

FIG. 5 is a longitudinal sectional view along the centre line of FIG. 4, showing the probe with the optical contact in a retracted position;

FIG. 6 is a longitudinal sectional view on the centre line of FIG. 3, showing the probe in a coupling position;

FIG. 10 is a perspective view of the interior of the second connector part, with parts removed for clarity;

FIG. 11 is an end view of the interior of the second connector part;

FIG. 12 is a longitudinal sectional view of the first and second connector parts prior to interengagement;

FIG. 15 is an exploded perspective view of the construction of the probe of the first connector part;

FIG. 16 is an exploded perspective view of an alternative form of probe construction;

FIGS. 20a–20d are schematic longitudinal views, partly in section and partly in elevation, of another embodiment showing first and second connector parts at different stages during the connection procedure;

FIGS. 21a–21d are longitudinal sectional views, partly in section and partly in elevation, of another embodiment showing first and second connector parts at different stages during the connection procedure;

FIGS. 24a–24d are longitudinal views, partly in section and partly in elevation, of first and second connector parts of another embodiment at different stages during the connection procedure.

DETAILED DESCRIPTION OF THE PREFERRED EMBODIMENT

Figure 1:
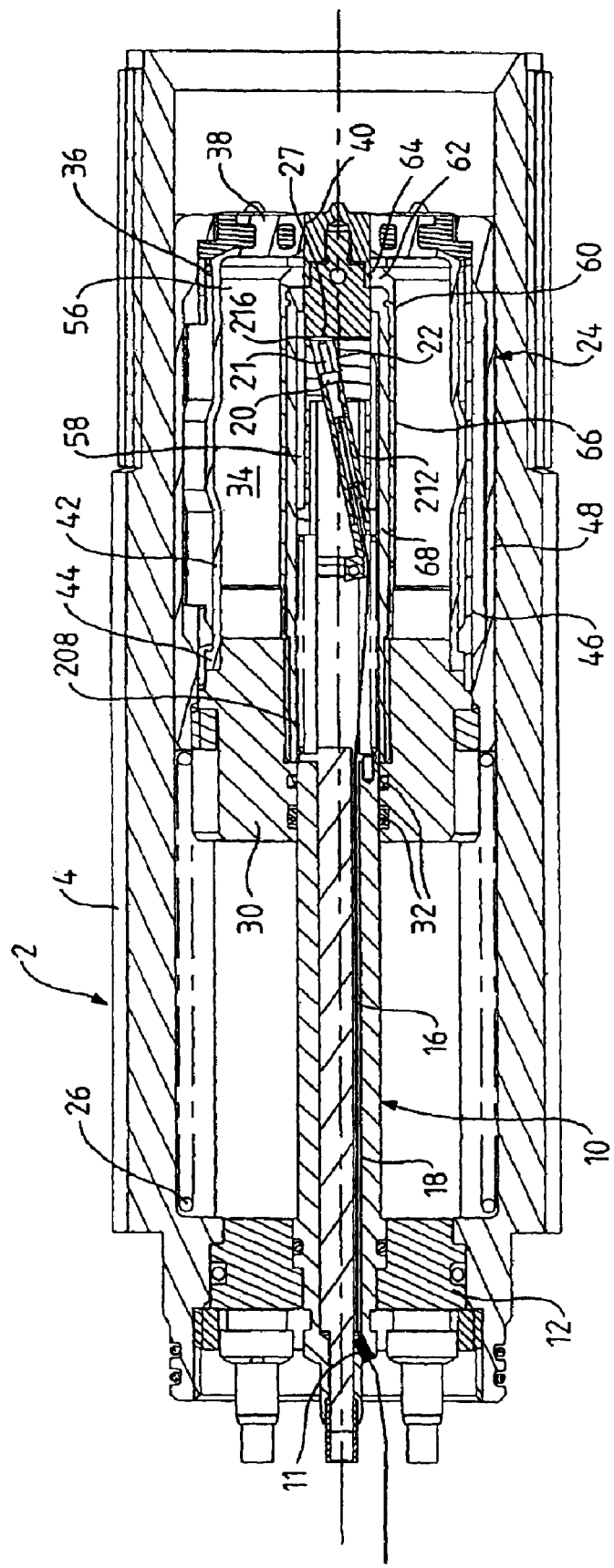
FIG. 1 is a longitudinal sectional view of a first connector part, taken on the lines I—I of FIG. 3.
Figure 2:
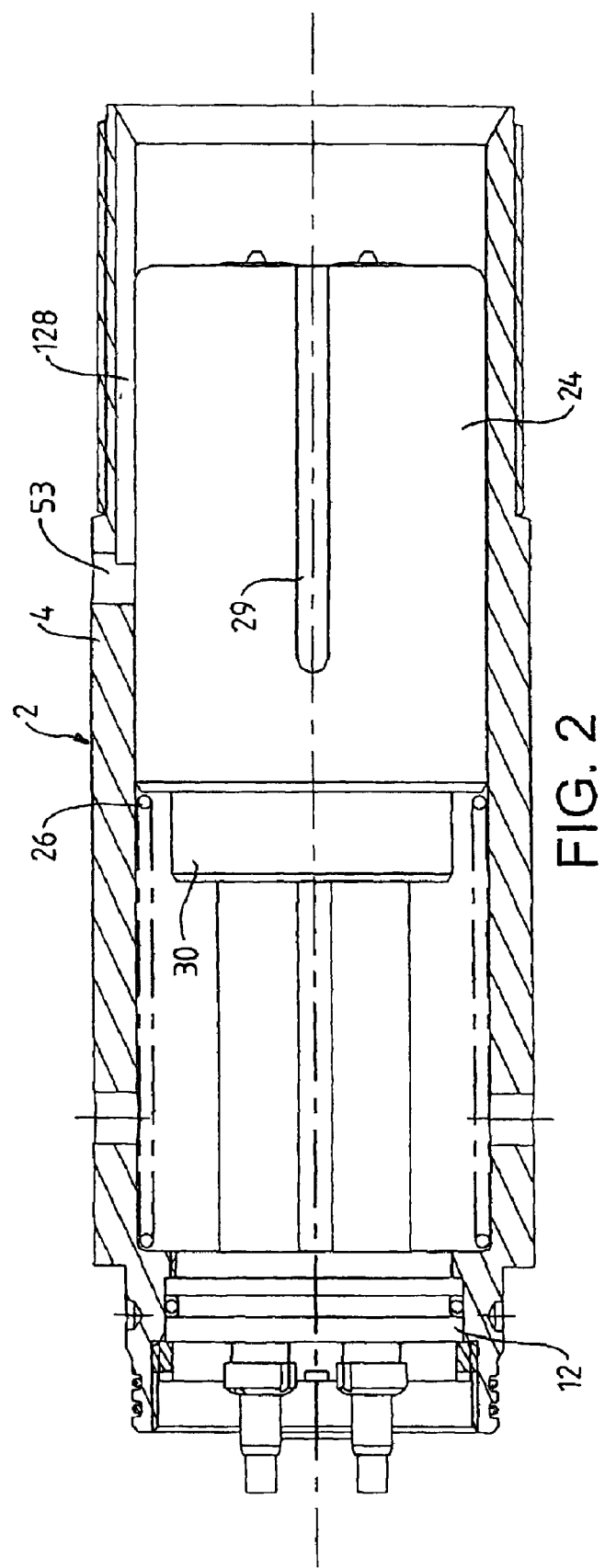
FIG. 2 is a longitudinal sectional view of the first connector part, taken on the lines II—II of FIG. 3.
Figure 9:
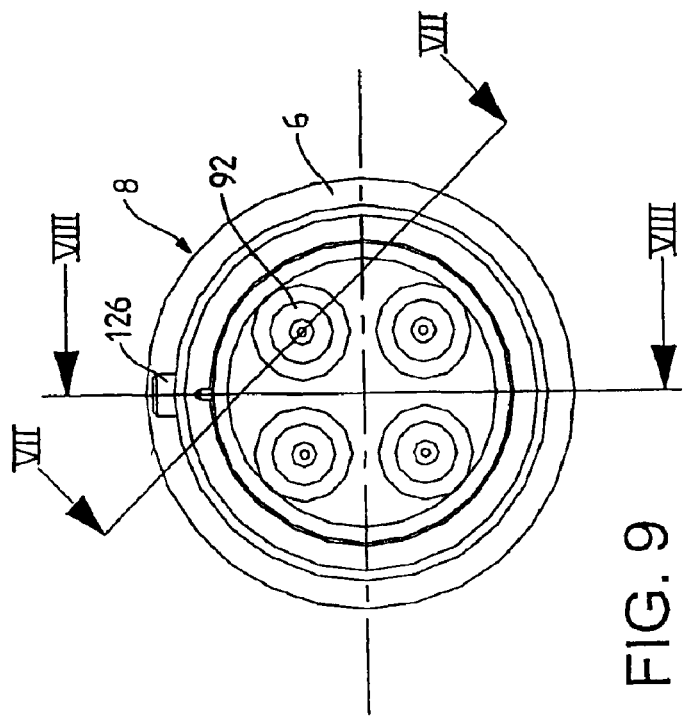
FIG. 9 is an end view of the second connector part.
Figure 3:
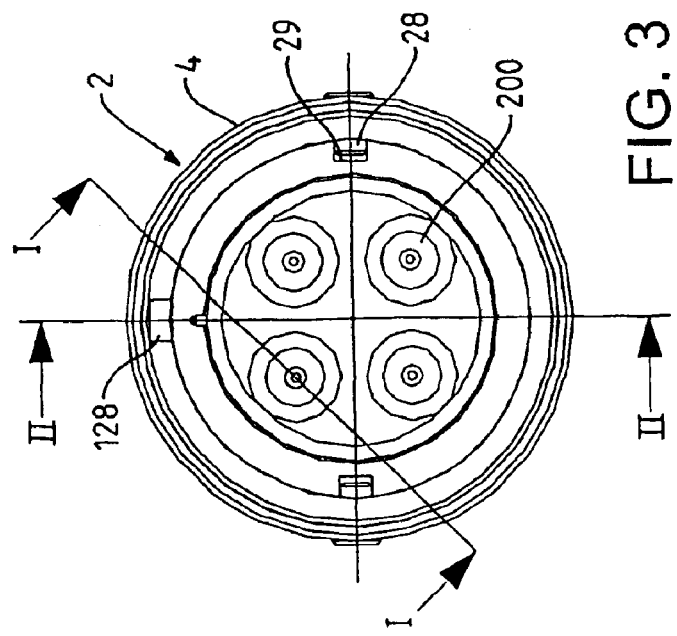
FIG. 3 is an end view of the first connector part.

The embodiment shown in FIGS. 1 to 14 will now be described. FIGS. 1 to 3 show a first connector part 2 having a receptacle 4 for receiving a plug 6 of a second connector part 8, shown in FIGS. 7 to 9. An axially arranged probe 10 projects forwardly from a rear support 12. An optical fibre 16 extends into the probe 10 via a rear opening 11 plugged by an epoxy water block and along a passage 18 in the probe to an optical contact 20 housed in a slanted passage 22 of the probe. At the front end of the optical contact 20, an optical pin 21 is provided. A front opening 27 is provided at the forward end of the slanted passage 22, where a seal 216 is also provided.

The construction of the probe 10 is best seen in FIGS. 4 to 6 and 15. At its forward end the probe has a nose portion 200. Behind it an electrical probe contact portion 202 is provided. The probe contact portion 202 is supported at the front end of a pair of axially extending conductive arms 204 which extend inside a sliding sleeve 206 made of insulating material. At its rear the sliding sleeve has a rear shoulder 207 which engages the front end of a spring 208, the rear end of which engages a shoulder 210 provided at the rear of the conductive arms 204. The nose portion 200, the probe contact portion 202 and the conductive arms 204 are all fixed in position within the receptacle 4, with the sliding sleeve being rearwardly slidable with respect thereto.

The optical contact 20 is supported in a rigid optical contact support tube 212, the front end of which engages in the slanted passage 22, which is formed in the sliding sleeve 206. The optical contact 20 is thus supported at an angle to the axial direction. A pair of outwardly directed lugs 214 are provided at the rear of the support tube 212 and engage in respective transverse slots 216 formed in the conductive arms 204. At the front face of the sliding sleeve 206 the seal 216 is provided.

As seen in FIG. 15 the conductive arms 204 are provided as two separate members, to which the pin contact end 202 is secured by a press fit pin 218 in electrically conductive manner. The sliding sleeve 206 is formed with a pair of axial passages 220 for receiving the respective conductive arms 204. The optical contact support tube 212 and the arms 204 pass through respective openings in the seal 216 in sealing manner.

In the version of FIG. 16, instead of the conductive arms 204, a single part-circular arm 205 is provided and a single passage 220 of corresponding shape is provided in the sliding sleeve 206. Also, a correspondingly shaped opening is provided in the seal 216 to receive the single arm 205 in sealing manner. The rear of the arm 205 is conductively connected to a rear shoulder member 211.

The optical contact 20 is contained within the periphery of the probe 10 when viewed in the axial direction, when the connector parts are disconnected as shown in FIGS. 1, 2 and 4. It therefore does not protrude from the probe. An electrical line extends rearwardly from the conductive arms 204 to a solder cup at the rear of the first connector part.

A shuttle 24 is slidably supported in the receptacle 4 of the first connector part 2. The shuttle 24 is forwardly biased by a spring 26 which seats against the support 12 at the rear. The spring 26 urges the shuttle 24 forwardly such that a pair of radially inwardly projecting keys 28 of the receptacle 4 engage the rear ends of respective keyways 29 in the outside wall of the shuttle 24, thereby defining the forward position of the shuttle 24. The key and keyway arrangement also prevents rotation of the shuttle in the receptacle whilst allowing longitudinal movement thereof.

The shuttle 24 has a rear wall 30 to which the probe 10 is slidably sealed by a pair of O-ring seals 32. The shuttle defines a chamber 34 around the front of the probe 10 ("the probe chamber"). The probe chamber 34 is defined within a bladder 36 filled with fluid media. The bladder 36 has a thick front wall 38 formed with an opening 40 which is sealingly engaged by the front end of the probe 10. The bladder has a thinner side wall 42 extending to a rear flange 44 captured between rear wall 30 and a bladder retaining sleeve 46. The bladder retaining sleeve is supported by an outer sleeve 48 of the shuttle 24 and is formed with radial ports (not shown) communicating with radial ports (not shown) in outer sleeve 48 between the sleeves 46 and 48. The outer sleeve 48 is exposed to the ambient water in receptacle 4 via radial ports 53. The outside of bladder side wall 42 is therefore effectively exposed to outside pressures and thus allows volume changes within probe chamber 34 to equalise the pressure therein with external pressure, thereby minimising any tendency for outside water or other contaminants to enter probe chamber 34.

The probe chamber 34 comprises an outer sub-chamber 56 and four inner sub-chambers 58. Each inner sub-chamber is defined by an inner bladder 60 which is seated on rear wall 30 and projects forwardly therefrom. The inner bladder 60 has a thick front wall 62 formed with an opening 64 through which the probe 10 passes in slidable and sealing manner. The inner bladder 60 has a thinner side wall 66 supported on an inner bladder sleeve 68, which is formed with radial ports (not shown) to communicate the side wall 66 with the interior of the sub-chamber 58. The outside of bladder side wall 66 is exposed to the pressure in the outer sub-chamber 56, thereby enabling inner sub-chamber 58 to equalise its pressure relative to outer sub-chamber 56. Outer sub-chamber 56 is able to equalise its pressure relative to the outside by exposure of bladder side wall 42 to outside pressure via the previously described radial ports.

Both the front opening 27 of optical fibre passage 22 and the electrical contact 25 are located in the inner sub-chamber 58 when the connector parts are disconnected, as shown in FIGS. 1, 2 and 4.

The second connector part 8 will now be described. The plug 6 has an orientation key 126 for engagement in a corresponding keyway 128 of the receptacle 4. A fibre optic 76 extends forwardly from an epoxy water block 300 into a chamber 78 at the front of the plug 6. At its front end the fibre optic 76 is provided with an optical contact 80 arranged at an angle to the axial direction. The optical contact includes a spring 82 allowing rearward resilient movement of a contact socket 84 at the front of the optical contact. This is a known optical contacting arrangement. The optical contact 80 and its mounting arrangement are supported on an optical contact support 81.

The chamber 78 containing fluid media is defined within a bladder 86 having a thick front wall 88 formed with an opening 90 in which a shuttle piston 92 is sealingly engaged. An electrical contact ring 130 is provided towards the rear of the shuttle piston 92 and is connected to a solder cup 132 at the back of the plug 6. The bladder 86 has a circumferentially extending thinner side wall 94 terminating at its rear with a flange 96 captured between a rear wall 98 and a bladder retaining sleeve 100. The retaining sleeve 100 is formed with radial ports 102 and the plug 6 is formed with radial ports 104. The outside of the side wall 94 of the bladder is thus communicated with the outside via radial ports 102, a radial gap 106 between the bladder retaining sleeve 100 and the inside of plug 6, and the radial ports 104 through the plug. The communication of the outside of the bladder 86 with the outside environment allows the bladder to change in volume in response to external pressure changes and displacements due to entry of the probe 10. The pressure in chamber 78 may thus be equalised with external pressure so as to minimise any opportunity for external water or contaminants to enter the chamber.

The chamber 78 of the second connector part 8 is divided into an outer sub-chamber 108 and four inner sub-chambers 110. Each inner sub-chamber 110 is defined within an inner bladder 112 which extends forwardly from the rear wall 98. The inner bladder 112 has a thick front wall 114 formed with an opening 116 through which the shuttle piston 92 passes in sealing manner. The inner bladder 112 has a circumferentially extending thinner side wall 118, the outside of which is exposed to the pressure in the outer sub-chamber 108, thereby allowing pressure equalisation of the inner sub-chamber 110 relative to the outer sub-chamber 108. The inner bladder 112 is supported at its front end on a sleeve 120 around the shuttle piston 92. The sleeve 120 is formed with a slot opening 122 allowing optical contact socket 84 to be positioned in close proximity to the shuttle piston 92 and, as will be described later, to allow the optical contact pin 21 of the first connector part to gain access to the optical contact socket 84. The inner bladder 112 includes a tubular side portion 121 which receives the optical contact socket 84.

Figure 7:
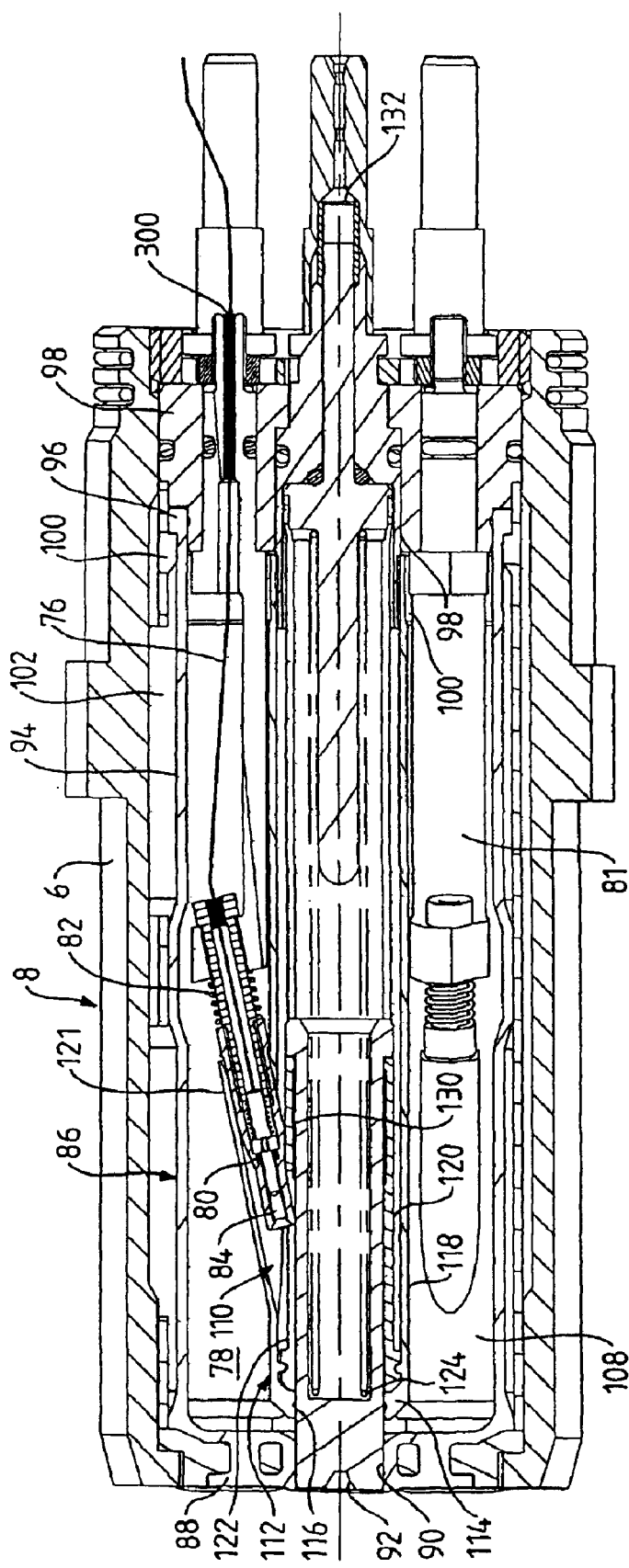
FIG. 7 is a longitudinal sectional view of a second connector part, taken along the lines VII—VII of FIG. 9.
Figure 8:
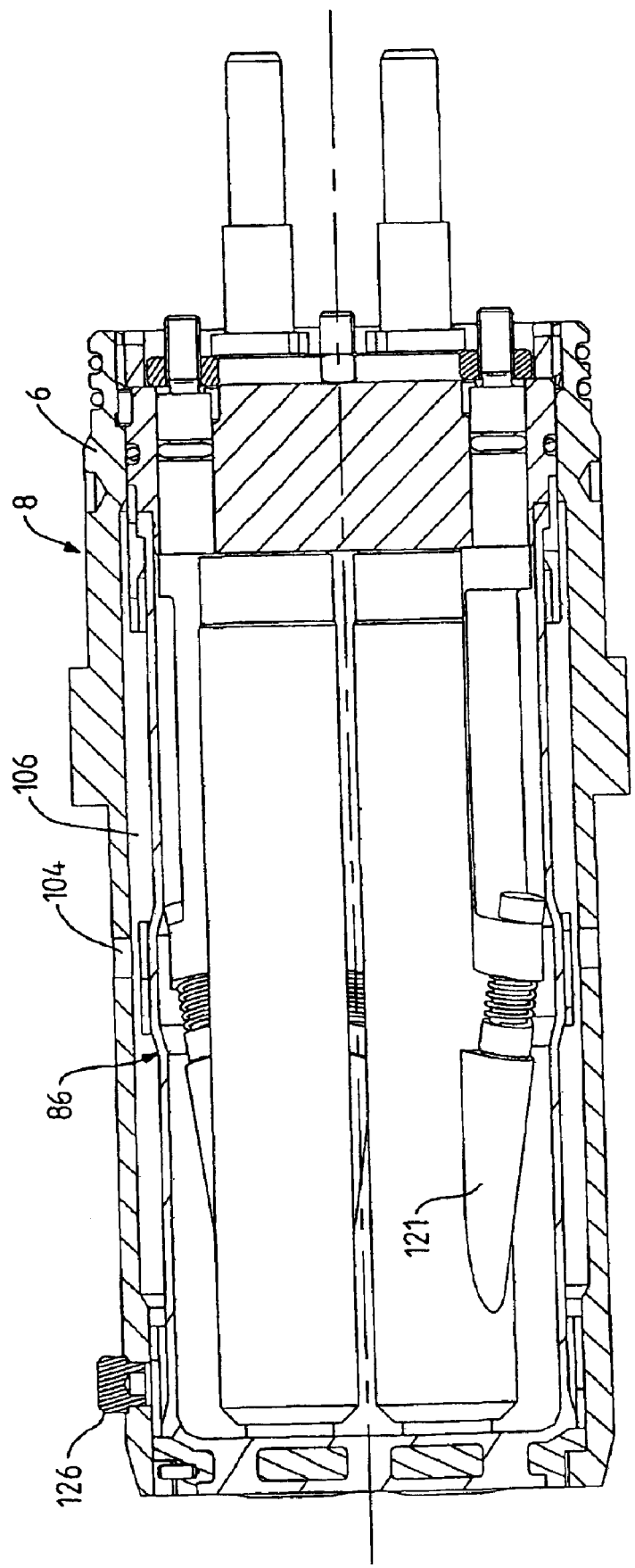
FIG. 8 is a longitudinal sectional view of the second connector part, taken along the lines VIII—VIII of FIG. 9.

The shuttle piston 92 is forwardly biased by a spring 124 so that in the unmated condition of the second connector part 8 shown in FIG. 7 the shuttle piston blocks and closes opening 90, which forms the entrance to the fluid filled chamber 78, and the opening 116, which forms the entrance to the inner sub-chamber 110 of the chamber 78.

The connection procedure of the first and second connector parts will now be described. The connector parts are brought into axial interengagement by relative axial movement towards each other. The plug 6 of the second connector part enters the receptacle 4 of the first connector part, such that the front wall 88 of bladder 86 makes contact with the front wall 38 of bladder 36. With continued interengagement, the plug 36 pushes the shuttle 24 rearwardly (to the left as shown in the drawings) against the bias of spring 26. At this time, the sliding sleeve 206 of the probe 10 holds its position relative to the receptacle 4, under the influence of spring 208. The probe 10 pushes shuttle piston 92 rearwardly of the plug 6 against the bias of spring 124. The spring 208 therefore has a greater spring constant than spring 124, preferably by a substantial margin.

Figure 13:
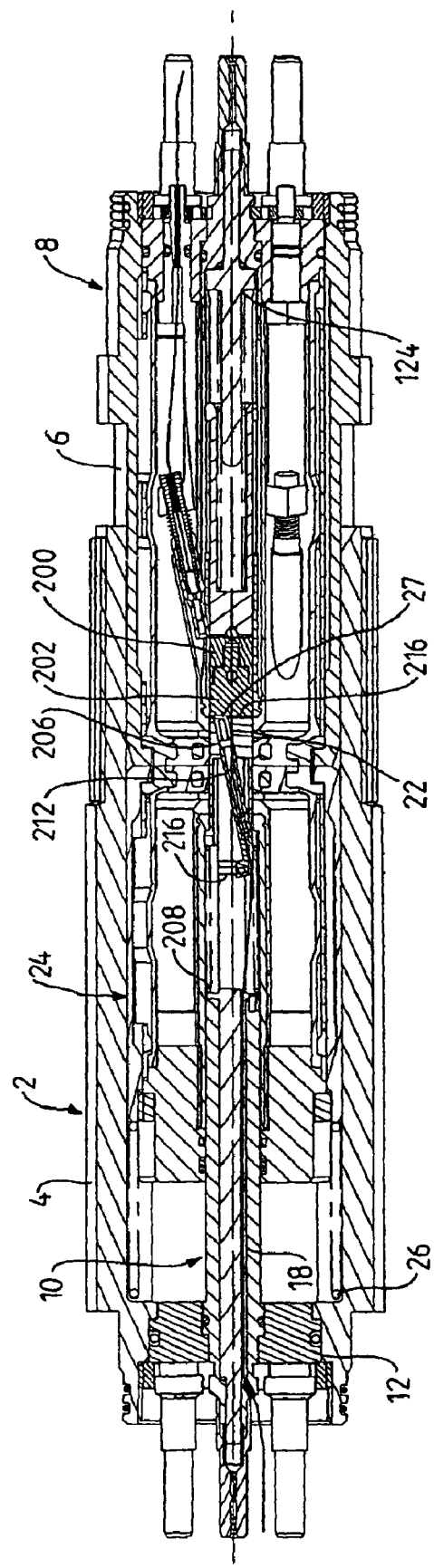
FIG. 13 is a longitudinal sectional view of the first and second connector parts at a first stage of interengagement.

With continued interengagement the connector parts reach an intermediate position as shown in FIG. 13. At this stage springs 26 and 124 have been compressed a considerable amount, but spring 208 has not been compressed and has held the sliding sleeve 206 of the probe 10 in its initial forward position.

With further interengagement of the connector parts, the plug 6 urges the shuttle 24 further rearwardly in the receptacle 4, additionally compressing spring 26. The shuttle 24 pushes on the rear shoulder 207 of the sliding sleeve 206 so as to urge it rearwardly in the receptacle and compress spring 208. The shuttle piston 92 is pushed rearwardly by the probe 10, further to compress spring 124. Once these actions are completed the connector parts are fully mated, as shown in FIG. 14.

At the intermediate stage shown in FIG. 13 the contact pin 21 of optical contact 20 is fully disposed inside slanted passage 22 of probe 10 and does not protrude therefrom. Therefore, up until this point, during the mating procedure, the probe 10 passes through the openings 64 and 40 in the front walls 62 and 38 of the receptacle bladders 60 and 36 respectively, and through the openings 90 and 116 in the front walls 88 and 114 of the bladders 86 and 112 respectively, without the optical contact pin 21 interfering with the passage of the probe through those openings. The probe 10 slides axially through these openings in sliding engagement with the respective seals as the nose portion 200 and probe contact portion 202 advance into the chamber 78 of the second connector part 8. Subsequently, as the sliding sleeve 206 of the probe 10 is urged rearwardly from the position shown in FIG. 13 to that shown in FIG. 14, the slanted passage 22 in the sliding sleeve 206 moves rearwardly along the optical contact support tube 212. The rear of this tube is restrained from axial movement relative to the receptacle by the engagement of the lugs 214 in the transverse slots 216 of the conductive arms 204, whilst transverse movement is permitted. Thus the rearward movement of the sliding sleeve 206 causes, by a camming action, a lateral movement of the optical contact support tube.

The rearward movement of the sliding sleeve 206 also results in it separating from the probe contact portion 202 and uncovering the front opening 27 of passage 22. The contact pin 21 emerges from front opening 27 of passage 22 and slides into contact socket 84 to establish the optical coupling laterally outwardly of the probe. The contact pin is thus first "carried" by the probe from the first connector part to the second connector part, whereafter the optical coupling is established in the second connector part.

Figure 14:
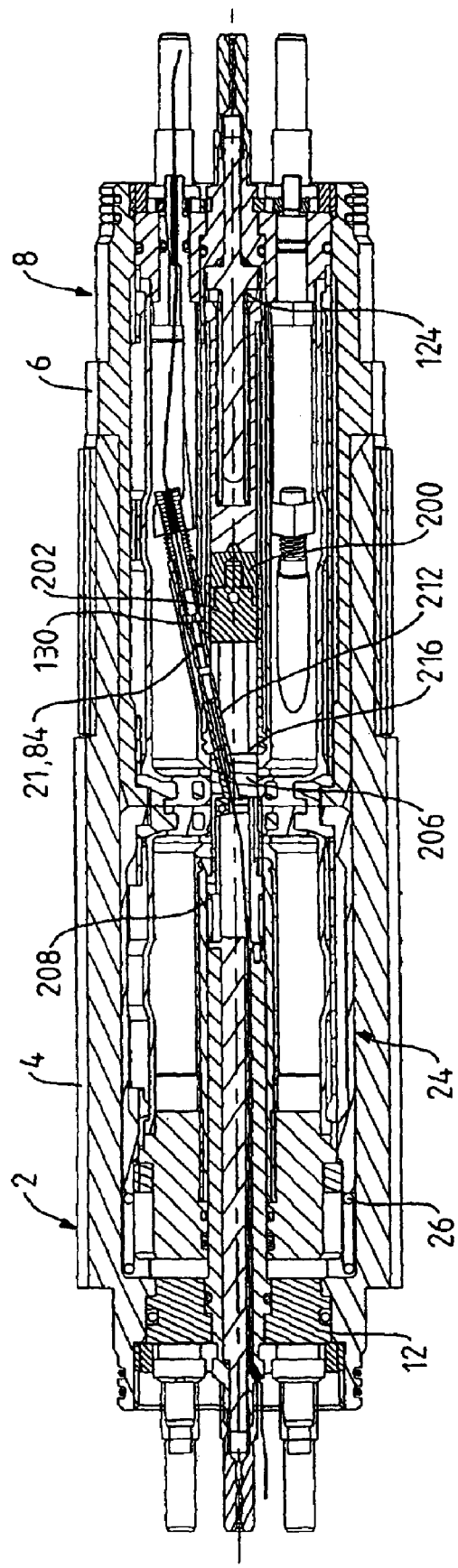
FIG. 14 is a longitudinal sectional view of the first and second connector parts when fully interengaged.

As far as making an electrical connection is concerned, this is not established at the intermediate stage shown in FIG. 13, but is established when the shuttle piston 92 has been urged further rearwardly to the fully interengaged condition shown in FIG. 14. At this time the electrical probe contact portion 202 engages in the electrical contact socket 130 of the plug 6.

The above described embodiment is a four probe connector, allowing four optical couplings and four electrical couplings to be established. However, the same principles of operation are applicable to a single probe connector, or connectors with different numbers or probes.

Figure 17:
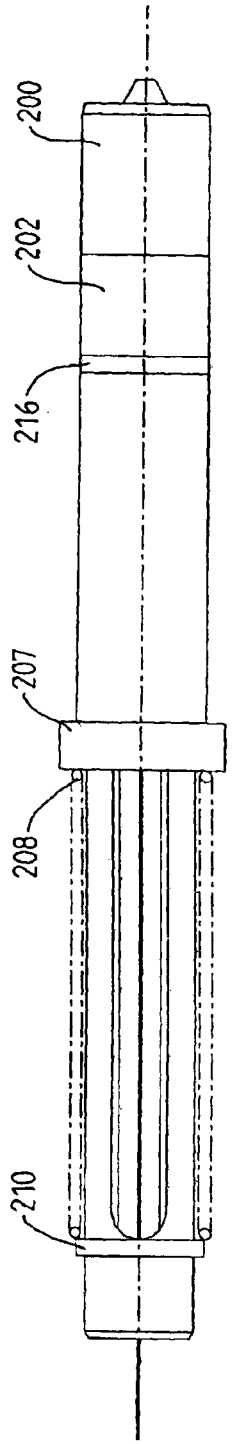
FIG. 17 is a top view of another embodiment of the probe.
Figure 18:
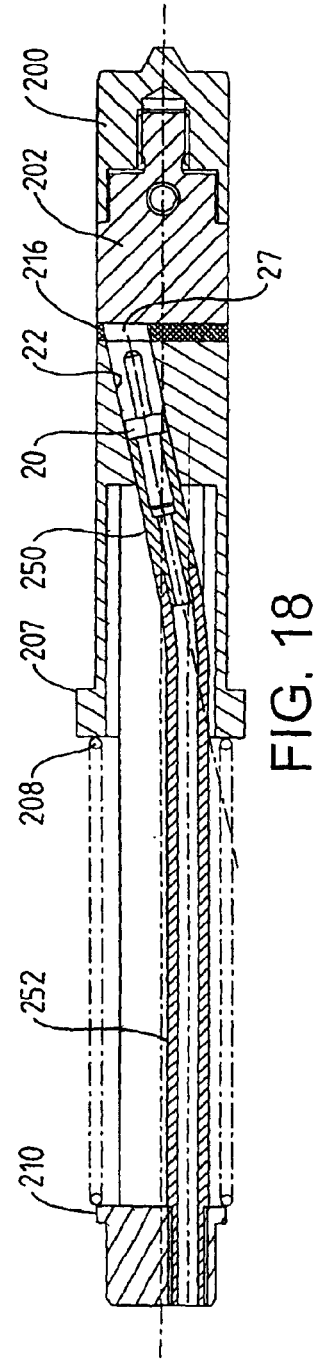
FIG. 18 is a longitudinal sectional view along the centre line of FIG. 17, showing the optical member in a retracted position.
Figure 19:
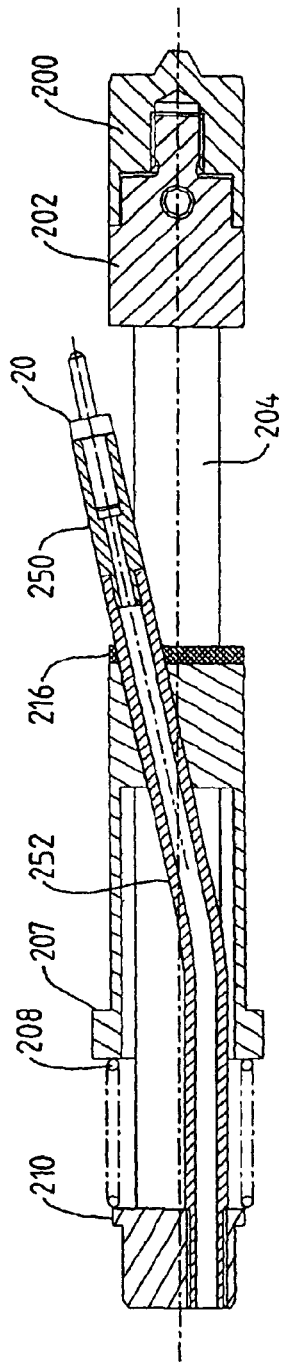
FIG. 19 is a view similar to FIG. 18 but showing the optical member in a coupling position.

FIGS. 17 to 19 show another embodiment in which the same reference numerals are used to designate the same parts as the embodiment of FIGS. 1–15. This embodiment differs however in that the optical contact 20 is carried by a rigid tube 250 which is itself supported at the front of a flexible tube 252. The rearward movement of the sliding sleeve 206 relative to the rest of the probe 10 causes the flexible tube 252 to flex as necessary for the optical contact pin 21 to emerge from the front opening 27 of the passage 22 to establish the optical coupling.

The manner of operation of the embodiment of FIGS. 17 to 19 is otherwise substantially the same as that of FIGS. 1 to 15.

FIGS. 20a–20d show schematically the manner of operation of another embodiment. In this case the probe 10 comprises an inner body 142 and an outer sleeve arranged axially slidably relative to the inner body. A spring 146 biases the outer sleeve 144 to a forward position relative to the inner body 142 when the connector parts are unmated, as shown in FIG. 20a. At this time the front side opening 27 of the probe 10 is closed by the outer sleeve 144.

The connection procedure is shown in FIGS. 20a–20d. As seen in FIG. 20b, the front walls 38 and 88 of the respective chambers 34 and 78 are brought together and the front of the probe 10 engages the front of the shuttle piston 92. With further axial interengagement the spring 124 biasing the shuttle 92 compresses, allowing the probe 10 to pass through the opening 90 into the chamber 78. As seen in FIG. 20c, the outer sleeve 144 of the probe remains in its forward, closing position as the probe advances through the opening 40 of the chamber 34 and through the opening 90 of the chamber 78. Thus, a good seal between the probe and the front walls 38 and 88 is maintained during connection.

Once the front side opening 27 has entered the chamber 78, with continued axial interengagement, the outer sleeve 10 is urged rearwardly relative to the sleeve inner body 142 against the bias of the spring 146 and the outer sleeve 144 is retracted to uncover and open the front side opening 27. This is shown in FIG. 20d. The advancement of the optical fibre 16 out of the side opening takes place by compression of a spring 18 and forward movement of the optical contact 20.

In a modification of the embodiment of FIGS. 20a–20d, a seal could be fitted between the outer sleeve 10 and the inner body, to provide an extra barrier against sea water. For example an O-ring seal could be provided on the inner body 142 so as to be in sealing engagement with the front of the outer sleeve 144 when in its closed position.

Figure 21C:
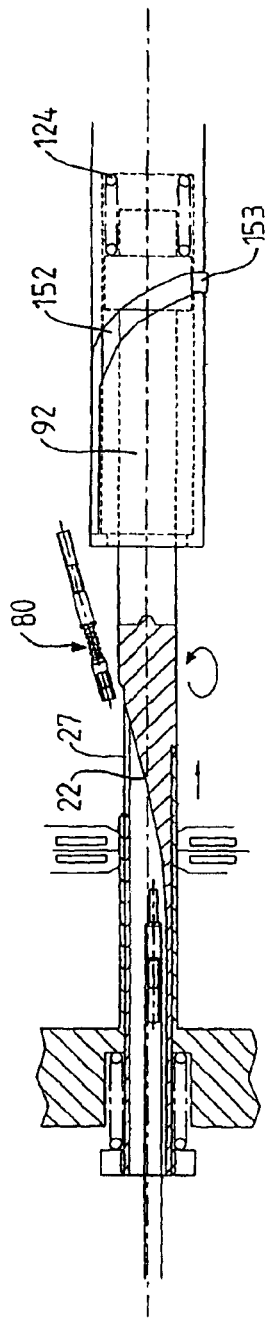
Figure 21D:
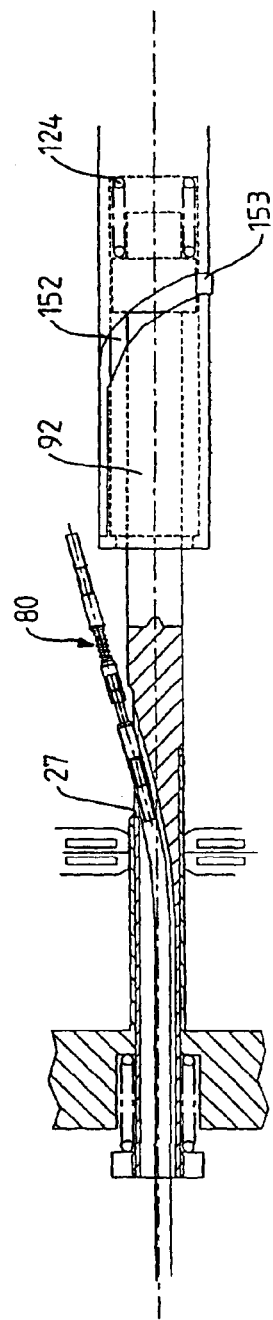
Figure 23:
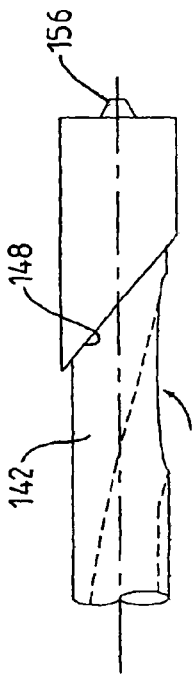
FIG. 23 is a longitudinal elevation view of an inner body of the first connector part of FIGS. 21a–21d.
Figure 22:
FIG. 22 is a longitudinal elevation view of an outer sleeve of the first connector part of FIGS. 21a–21b.

The embodiment of FIGS. 21a–21d, 22 and 23 is similar to that of FIGS. 20a–20d, except that the inner body 142 is arranged to rotate within the outer sleeve 144 to uncover and open the front side opening 27. As seen in FIG. 22, which shows the outer sleeve 144 alone, this includes an angled profile 146 at its front end, and as seen in FIG. 23, which shows the probe inner body 142 alone, this has a rearwardly facing correspondingly angled profile 148. As seen in e.g. FIG. 21a, the sleeve 150 which houses the spring 124 for the shuttle piston 92 is formed with a key way 152 which extends rearwardly first axially and then axially with a circumferential component. The shuttle piston 92 is provided with a radially outwardly projecting key 153 which engages in the key way. The front of the shuttle piston 92 is formed with an oblong slot 154 for receiving a corresponding oblong projection 156 at the front end of probe 10. The projection and slot are engageable such that the probe and the shuttle piston are non-rotationally connected.

The connection sequence is shown in FIGS. 21a–21d. When the front walls 38 and 88 of the respective chambers 34 and 78 come together the projection 156 locates in the slot 154, as seen in FIG. 21b. At this stage the front side opening 27 of the probe 10 faces downwardly (as shown by way of example in the drawing) and the outer sleeve 146 advances through the openings 40 and 90 of the chambers 34 and 78 whilst maintaining the closed position. There is no rotation of the shuttle piston 92, and hence of the inner body 142 of the probe, at this time as the key 153 remains in the axially extending part of the key way 152.

With continued axial interengagement the key starts to move along the part of the key way which extends circumferentially, causing the shuttle piston 92 to rotate and in turn causing the inner body 142 of the probe 10 to rotate. The rearwardly facing angled profile 148 of the inner body 142 acts on the forwardly facing angled profile 146 of the outer sleeve 144, such that the inner body is advanced forwardly relative to the outer sleeve, against the bias of spring 146. The front side opening 27 in the passage 18 undergoes a half turn so as to face upwardly. Because of the angled profile 146 of the outer sleeve 144, when the inner body turns to this position the front side opening 27 is no longer covered by the outer sleeve and hence the optical pin 21 is able to emerge from the passage 18 to establish the optical coupling.

As with the embodiment of FIGS. 20a–20d, the embodiment of FIGS. 21a–21d, 22 and 23 allows the two front walls 38 and 78 to act on a full cylindrical probe at all times, thereby improving the sealing properties of the connector during the connection procedure.

FIGS. 24a–24d show schematically another embodiment at stages during the connection procedure. In this embodiment the probe 10 has a hinged portion 160 which is biased by a spring (not shown) to an open position. As seen in FIG. 24a, the hinged portion 160 is held shut by engagement with the edge of the opening 40 of the bladder front wall 38. Once the hinged portion 160 has passed through the opening 40 and further through the opening 90 in the front wall 88 of the second connector part 8, it springs open to allow the optical contact 21 to emerge from the front side opening 27 of the probe and establish optical contact with the optical contact side 84.

Generally, in the preferred embodiments, an optical coupling is made between a first optical member, in the form of optical contact 20, and a second optical member, in the form of optical contact 80. The coupling is made possible by the entry of the probe 10 to the chamber 78, whereby the probe provides an optical path between the connector parts. Once this path is provided, the exact location of the optical coupling is not critical. Although it is shown in the preferred embodiments as taking place in the chamber 78, the optical coupling could alternatively be made in the e.g. passage 22 of the probe and/or in the chamber 34.

The slant of the optical path to the axial direction where it passes through the side of the probe will generally be substantially less than 90°. This avoids the optical fibres 16 and 76 leading to the optical contacts 20 and 80 respectively having to turn through a substantial angle from the axial direction to the direction of the optical path where it passes through the side of the probe. There is usually a maximum curvature to which optical fibres may be subjected without signal attenuation or other problems, so that if an optical fibre is turned through a large angle this adds to the space requirements in the lateral direction. For this reason, smaller slant angles are advantageous, as the width of the connector can be kept to a minimum.

In the preferred embodiments, a small slant angle to the axial direction also assists location of the optical contact pin 21 in the optical contact socket 84 during interengagement. It will be appreciated that the positions of the contact pin and contact socket could be reversed, with the pin being located on the plug 6 and the socket on the receptacle 4.

The slant angle to the axial direction is preferably less than 60°, more preferably less than 45°, more preferably less than 30°.

There are various advantageous features in the embodiments described herein. It will be understood that features from different embodiments may be combined in combinations which are not shown in the drawings. For example the provision of a means of covering the optical contact in the probe until it has entered the second connector part may be used in embodiments having outer and inner sub-chambers in the first connector part and/or the second connector part. The covering feature may also be combined with the use of a probe which provides both an optical and an electrical connection. Many other combinations are of course possible, and the embodiments should be considered as illustrative and not limiting of the scope of the invention.

What is claimed is:

1. A connector for making an optical connection underwater or in a wet environment, comprising first and second connector parts adapted to be interengaged, the first connector part having a first optical member for establishing an optical coupling with a second optical member of the second connector part when the connector parts are interengaged, the first connector part having a probe and the second connector part having a chamber containing fluid media and being provided with a seal defining an opening thereto, wherein the probe has a forward portion for entry into the chamber of the second part containing fluid media during interengagement of the connector parts, so that when the connector parts are interengaged the probe provides an optical path between the first connector part and the chamber of the second connector part and thereby allows the first and second optical members to establish said optical coupling, said optical path extending from the first connector part along the probe and passing into the chamber of the second connector part at a slant to the axial direction, and wherein during interengagement of the connector parts the probe slides axially through the opening in sliding engagement with the seal and continues to do so as the forward portion of the probe advances into the said chamber containing fluid media.

2. A connector as claimed in claim 1, wherein the first optical member is disposed internally of the probe at least during the passage of the forward portion of the probe through the seal of the second connector part.

3. A connector as claimed in claim 1, wherein the probe comprises relatively movable parts arranged to enclose the first optical member when the first and second connector parts are not interengaged and arranged to open after the probe has entered the chamber of the second connector part to allow the optical coupling between the first and second optical members to be established.

4. A connect or as claimed in claim 1, comprising a first spring arranged to deform during a first phase of interengagement of the connector parts until the forward portion of the probe is located in the chamber of the second connector part containing fluid media, and a second spring arranged to deform during a second phase of interengagement of the connector parts, to permit the forward portion of the probe to advance forwardly relative to a rear portion and thereby allow the optical coupling between the first and second optical members to be established.

5. A connector as claimed in claim 1, wherein, after the probe has entered the chamber of the second connector part, at least one of the first and second optical members is arranged to move from a retracted position to a coupling position.

6. A connector as claimed in claim 5, wherein the first optical member is arranged to move axially relative to a guide portion of the probe during interengagement of the connector parts, the guide portion being arranged to urge the first optical member laterally outwardly of the probe from a retracted position to a coupling position during said interengagement.

7. A connector as claimed in claim 6, wherein the probe has a surface slanted relative to the axial direction which guides the first optical member to the coupling position.

8. A connector as claimed in claim 1, wherein the second connector part comprises pressure balancing means for allowing pressure in the chamber to balance relative to external pressure.

9. A connector as claimed in claim 1, wherein the chamber of the second connector part comprises an outer sub-chamber and an inner sub-chamber.

10. A connector as claimed in claim 9, wherein the outer sub-chamber is provided with said seal defining said chamber opening, and the inner sub-chamber is provided with a seal defining an inner sub-chamber opening, and wherein during interengagement of the connector parts the probe slides axially through the outer and inner sub-chamber openings and in sliding engagement with their respective seals, whilst the forward portion of the probe advances into the inner sub-chamber.

11. A connector as claimed in claim 10, wherein the first connector part further comprises pressure balancing means for allowing pressure in the probe chamber to balance relative to external pressure.

12. A connector as claimed in claim 9, wherein the second connector part comprises a plurality of inner sub-chambers, each provided with a respective seal defining a respective inner sub-chamber opening, and wherein the first connector part comprises a plurality of probes each for advancement during interengagement of the connector parts into a respective inner sub-chamber of the second connector part to establish a plurality of optical couplings.

13. A connector as claimed in claim 1, wherein the first connector part comprises a probe chamber in which the first optical member is disposed when the connector parts are not interengaged, the probe chamber and the probe being relatively axially movable to allow the probe to emerge from the probe chamber during interengagement of the connector parts, and the probe chamber containing fluid media.

14. A connector as claimed in claim 13, wherein the probe chamber comprises an outer sub-chamber and an inner sub-chamber.

15. A connector as claimed in claim 14, wherein the outer and inner sub-chambers of the probe chamber are provided with respective seals defining respective openings thereto, and wherein during interengagement of the connector parts the probe slides axially through the inner and outer probe sub-chamber openings in sliding engagement with their respective seals.

16. A connector as claimed in claim 13, wherein the chamber of the second connector part and the probe chamber of the first connector part are sealed from each other when the first and second connector parts are interengaged.

17. A connector as claimed in claim 1, wherein the probe is provided with a first electrical contact portion, and the second connector part has a second electrical contact portion, the first and second electrical contact portions being arranged to make electrical contact when the connector parts are interengaged.

18. A connector for making an optical connection underwater or in a wet environment, comprising first and second connector parts adapted to be interengaged, the first connector part having a first optical member for establishing an optical coupling with a second optical member of the second connector part when the connector parts are interengaged, the second connector part having a chamber containing fluid media and being provided with a seal defining an opening thereto, and the second connector part being provided with a shuttle piston resiliently biased to a forward position in which it engages a radially inwardly facing surface of the seal so as to close the opening defined thereby when the connector parts are disengaged, and the first connector part having a probe for entry into the chamber of the second part containing fluid media during interengagement of the connector parts, the shuttle piston of the second connector part being arranged to be engaged by the probe and urged rearwardly during said interengagement, the probe then engaging the radially inwardly facing surface of the seal so as to close the opening defined thereby, and, when the connector parts are interengaged, the probe providing an optical path between the first connector part and the chamber of the second connector part to allow the first and second optical members to establish said optical coupling, said optical path extending from the first connector part along the probe and passing into the chamber of the second connector part at a slant to the axial direction.

19. A connector for making an optical connection underwater or in a wet environment, comprising first and second connector parts adapted to be interengaged, the first connector part having a first optical member for establishing an optical coupling with a second optical member of the second connector part when the connector parts are interengaged, the first connector part having a probe and the second connector part having a chamber containing fluid media and being provided with a seal defining an opening thereto, wherein the probe has a main body including a forward portion for entry into the chamber of the second part containing fluid media during interengagement of the connector parts, wherein during the interengagement of the connector parts the first optical member is arranged to move from a retracted position in the probe main body to a coupling position laterally outwardly of the probe main body, so that when the connector parts are interengaged the probe provides an optical path between the first connector part and the chamber of the second connector part and thereby allows the first and second optical members to establish said optical coupling, said optical path extending from the first connector part along the probe and passing into the chamber of the second connector part at a slant to the axial direction, wherein during the interengagement of the connector parts the probe slides axially through the opening in sliding engagement with the seal and continues to do so as the forward portion of the probe advances into the said chamber containing fluid media, and wherein the probe is provided with a first electrical contact portion on the probe main body, and the second connector part has a second electrical contact portion, the first electrical contact portion being arranged to slide axially into electrical contact with the second electrical contact portion when the connector parts are interengaged.

20. A connector as claimed in claim 19, wherein the second connector part is provided with a shuttle piston resiliently biased to a forward position in which it engages a radially inwardly facing surface of the seal so as to close the opening defined thereby when the connector parts are disengaged, the shuttle piston being arranged to be engaged by the probe and urged rearwardly during interengagement of the connector parts, the probe then engaging the radially inwardly facing surface of the seal so as to close the opening defined thereby.

* * * * *

UNITED STATES PATENT AND TRADEMARK OFFICE
CERTIFICATE OF CORRECTION

PATENT NO. : 6,929,404 B2  Page 1 of 1
DATED : August 16, 2005
INVENTOR(S) : Jones et al.

It is certified that error appears in the above-identified patent and that said Letters Patent is hereby corrected as shown below:

Title page,
Insert Item -- [30] Foreign Application Priority Data,
Oct. 31, 2000   (GB) ……………………………..0026582.7 --.

Signed and Sealed this

Third Day of January, 2006

JON W. DUDAS
*Director of the United States Patent and Trademark Office*